(12) United States Patent
Wang et al.

(10) Patent No.: US 7,154,064 B2
(45) Date of Patent: Dec. 26, 2006

(54) METHOD OF IMPROVING WELD QUALITY

(75) Inventors: Pei-Chung Wang, Troy, MI (US);
Hai-Lung Tsai, Rolla, MO (US);
Roland J. Menassa, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 215 days.

(21) Appl. No.: 10/730,731

(22) Filed: Dec. 8, 2003

(65) Prior Publication Data

US 2005/0121426 A1   Jun. 9, 2005

(51) Int. Cl.
*B23K 26/00* (2006.01)
(52) U.S. Cl. .......................... 219/121.64; 219/121.63; 219/121.85
(58) Field of Classification Search ........... 219/121.64, 219/121.63, 121.85, 121.6; 148/420, 437, 148/666, 688
See application file for complete search history.

(56) References Cited

U.S. PATENT DOCUMENTS

| | | | | |
|---|---|---|---|---|
| 4,000,392 A | * | 12/1976 | Banas et al. | ........... 219/121.63 |
| 4,857,697 A | * | 8/1989 | Melville | ................. 219/121.63 |
| 4,873,415 A | * | 10/1989 | Johnson et al. | ......... 219/121.64 |
| 5,142,119 A | * | 8/1992 | Hillman et al. | ......... 219/121.64 |
| 5,371,337 A | | 12/1994 | Campbell et al. | |
| RE36,926 E | * | 10/2000 | Austin et al. | ........... 219/130.21 |
| 6,410,882 B1 | * | 6/2002 | Okada | .................... 219/121.64 |

* cited by examiner

*Primary Examiner*—M. Alexandra Elve
(74) *Attorney, Agent, or Firm*—Kathryn A. Marra

(57) ABSTRACT

A method of improving weld quality between aluminum members by slowing the rate of solidification of a molten weld trough into solidified material. Upper and lower aluminum members are positioned together in contact between facing surfaces thereof to expose a first outer surface of the upper aluminum member to laser irradiation. A welding laser beam is moved in a path over the first outer surface, wherein the welding laser beam has an energy and width to progressively melt a trough of molten metal to a depth through the upper aluminum member and into the lower aluminum member. The molten metal in the trough has a void filled with gas, and the molten metal re-solidifies into re-solidified metal after the passage of the welding laser beam. An area in and around the trough is heated to slow the rate of solidification of the molten metal into the re-solidified metal, thereby preventing entrainment of the gas within the re-solidified metal.

8 Claims, 6 Drawing Sheets

PRIOR ART

METHOD OF IMPROVING WELD QUALITY

TECHNICAL FIELD

The present invention generally pertains to a welding process. More particularly, this invention pertains to a method of improving weld quality in laser welding of lightweight metal components, such as those composed of magnesium or aluminum. A separate heating means is used to raise the temperature of the lightweight metal components and thereby widen a heat-affected weld zone around a molten weld trough so as to slow solidification of the molten weld trough and thereby reduce porosity within a resultant weld bead.

BACKGROUND OF THE INVENTION

Use of lasers in industrial manufacturing environments is becoming increasingly widespread and such use includes welding of automotive body panels. Such body panels, however, are increasingly being produced from lightweight sheet metals such as aluminum and magnesium, which are traditionally not conducive to high production laser welding.

In general, laser welding is a joining process wherein coalescence of substrate materials is produced by heating the substrate materials to suitable temperatures without the application of pressure, and with or without the use of a filler material. More specifically, in a typical laser welding process, steel members are assembled with facing surfaces in juxtaposition, for example, to form a lap joint, wherein an outer surface of one of the steel members is irradiated with a laser beam to melt and fuse the steel members at the facing surfaces. In contrast to other welding processes, such as resistance welding, that generate heat concentrated at the facing surfaces, laser welding heats a zone extending from the irradiated outer surface down below the facing surfaces to create a pool of molten metal within both members that, upon solidification thereof, forms a weld nugget or bead that joins the two sheet members together.

Additionally, some laser welding applications require a technique known as "keyholing" that involves use of relatively high power lasers to make relatively deep penetrations at increased welding speeds. Keyholing involves heating the zone of laser focus above the boiling point of the substrate materials to form a vaporized hole in the substrate materials. The vaporized hole becomes filled with ionized metallic gas and becomes an effective absorber, trapping most of the energy from the laser into a cylindrical volume, known as a keyhole. Instead of heat being conducted mainly downward from the outer surface of one of the substrate materials, it is conducted radially outward from the keyhole, forming a molten region surrounding the ionized metallic gas. As the laser beam moves along the substrate materials, the molten metal fills in behind the keyhole and solidifies to form a weld bead.

While laser welding is widely successful in joining steel substrates, it has met with limited success in joining aluminum or magnesium substrates. Laser welding involves light beams and, thus, laser welding suffers from problems with reflective material such as aluminum. Additionally, aluminum presents several metallurgical difficulties because some common alloying elements therein, like zinc and magnesium, have very high vapor pressures and, thus, tend to boil out of a molten weld trough under typical laser welding conditions. Besides depleting the alloy content of the weld, this "boil out" condition leads to keyhole instability and high levels of porosity in laser welds, particularly where the depth of the keyhole is greater than the width of the weld bead. Also, lap-welded joints have a particular problem with out-gassing of coatings or contaminants on the aluminum substrates that leads to weld bead porosity.

In order to minimize porosity in the resultant weld nugget or bead it has heretofore been common practice to add filler metal to laser welding processes, or to pulse the laser in an attempt to alter the solidification rate of the molten weld trough. Regardless of the particular type of welding process used, most aluminum alloys must be welded with a filler metal having a different composition than the substrate aluminum to avoid weld cracking and porosity. Filler metal, unfortunately, is difficult to use with lasers because it is very difficult to get filler metal wire into the tiny melt zones that most lasers produce. Furthermore, attempts to optimize the welding heat input by pulsing the laser, and thereby controlling the rate of solidification of the molten weld trough, have not met with good results. In theory, it should be possible to pulse the laser on and off at a predetermined rate in order to permit gradual or slower solidification of the molten weld trough and thereby avoid porosity. In practice, however, this process of intrinsically regulating the temperature of the molten weld trough by pulsing the laser simply does not solve the problem of porosity.

Thus, there remains a need for a method of laser welding aluminum or magnesium substrates that does not require use of filler metal, yet results in substantially porosity-free welds.

SUMMARY OF THE INVENTION

The present invention meets these needs by providing an improved method of laser welding of lightweight metal materials, such as aluminum and magnesium, that uses a supplemental heating means to heat the lightweight metal materials and thereby widen the temperature distribution around a molten weld trough so as to slow solidification of the molten weld trough and thereby reduce porosity within a resultant solidified weld bead.

The method involves coalescence of lightweight metal substrate materials by heating the materials to suitable temperatures without the use of a filler material. For example, aluminum sheet members are assembled with facing surfaces in juxtaposition to form a lap joint, wherein an outer surface of one of the aluminum sheet members is irradiated with a laser beam to melt and fuse the aluminum sheet members at the facing surfaces thereof. The laser beam heats a zone extending from the irradiated outer surface down below the facing surfaces to create a molten weld trough of molten metal within both members that, upon solidification thereof, forms a weld nugget or bead that joins the two aluminum sheet members together. The heating means is supplemental or additional to the laser beam and acts to widen the heat or temperature distribution around the molten weld trough so as to prevent rapid solidification of the molten weld trough and resultant entrainment of gas bubbles therein.

According to an aspect of the present invention, there is provided a method of forming a linear weld between upper and lower sheet members composed of aluminum or magnesium. The method includes positioning the upper and lower sheet members together in contact between facing surfaces thereof to expose a first outer surface of the upper member to laser irradiation. The method also includes moving a welding laser beam in a path over the first outer surface, wherein the laser beam has an energy and width to progressively melt a trough of molten metal to a depth through the upper member and into the lower member. The molten metal in the trough has a pore filled with gas, and the molten metal re-solidifies into re-solidified metal after the passage of the laser beam. The method further includes heating in and around the trough to slow the rate of solidification of the molten metal into the re-solidified metal, thereby preventing entrainment of the gas within the re-solidified metal.

BRIEF DESCRIPTION OF THE DRAWINGS

These and other features and advantages of the invention will become apparent upon reading the detailed description in combination with the accompanying drawings, in which.

DESCRIPTION OF THE PREFERRED EMBODIMENT

In general, the present invention provides a method of improving weld quality in laser welding of aluminum or magnesium members wherein a heating means, which is separate from a welding laser, is used to heat the aluminum components so as to slow solidification of a molten weld trough created by the welding laser and thereby reduce porosity within a resultant weld bead. The term member as used herein encompasses components, sheet material, and the like. The present invention may best be understood in contrast to prior art aluminum laser welding processes.

Figure 1:
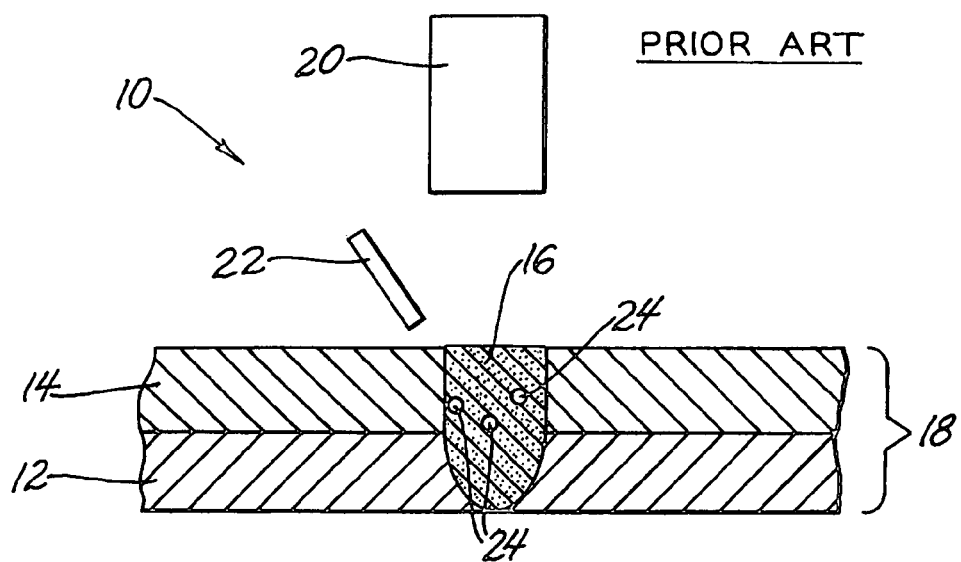
FIG. 1 illustrates a schematic representation of a laser welding setup according to the prior art, showing an upper and lower sheet of aluminum in cross-section.

Referring specifically now to the Figures, there is illustrated in FIG. 1 a laser welding setup 10 according to the prior art. The welding setup includes a lower sheet 12 composed of aluminum, an upper sheet 14 also composed of aluminum, and a weld 16 joining the upper and lower sheets 14, 12. The weld 16 is shown in cross section and may either be a cross section of a linear bead of a weld bead or may be a cross section of a discrete spot or tack weld. In any case, the upper and lower sheets 14, 12 collectively define an assembly 18 when welded together. The weld 16 is produced by a laser apparatus 20 in conjunction with a shield gas supply apparatus 22, as is well known to those of ordinary skill in the art. Unfortunately, prior art techniques for laser welding aluminum typically result in porosity 24 in the weld 16, as shown.

Figure 2:
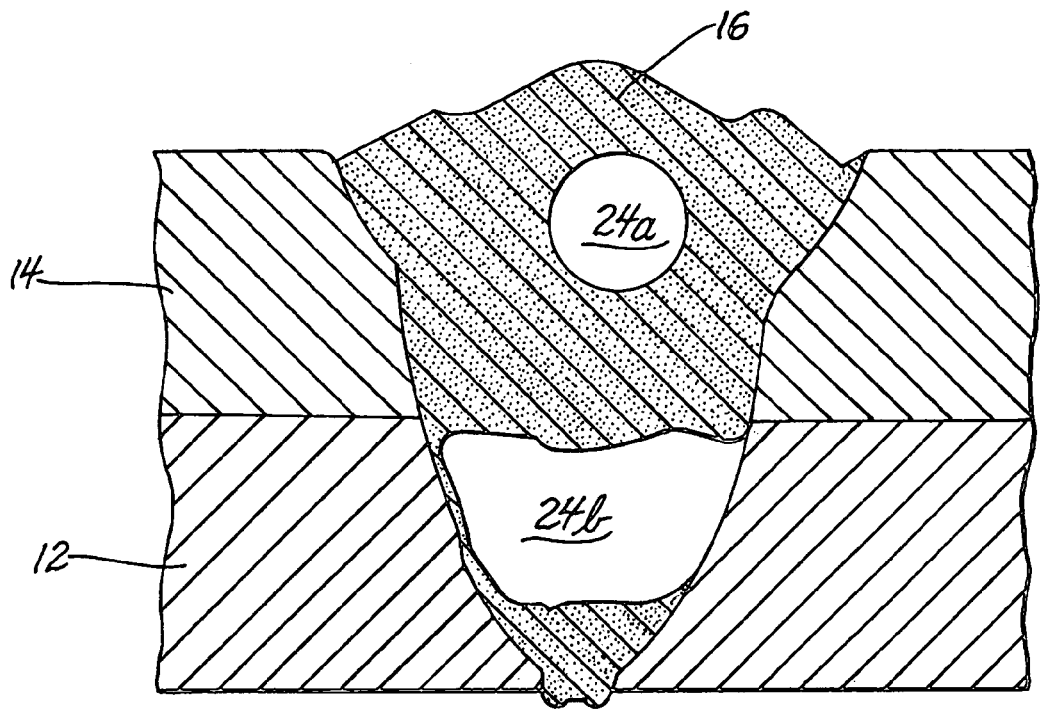
FIG. 2 illustrates an enlarged cross-sectional representation of an actual weld according to the prior art, showing an upper and lower sheet of aluminum joined by the weld.

More specifically, FIG. 2 depicts a cross-sectional representation of the weld 16 between lower and upper sheets 12, 14 of aluminum. As can be seen more clearly in this figure, prior art laser welding techniques yield multiple instances of porosity 24a, 24b in the weld 16. The porosity 24b is especially indicative of what little quantity of weld material may be present in any given location between the lower and upper sheets 12, 14. Thus, such large voids or porosity 24b make for a relatively weak joint between the lower and upper sheets 12, 14.

Still referring to the prior art, FIGS. 3A–3L represent computer generated output from a computer model of a prior art aluminum laser welding process. Each of FIGS. 3A–3L represent a graph or plot of the depth of a weld, shown along the ordinate in mm, and of the width or diameter of a weld, shown along the abscissa in mm. The model assumed a laser beam spot size of about 0.5 mm in diameter generated from a 2.5 kilowatt laser apparatus and focused into a single 3.0 mm thick aluminum sheet 26 having a top surface 28. FIGS. 3A–3L plot a sequence of laser welding including keyhole formation, molten metal flow, and solidification through time=1.5 ms to time=27.2 ms.

Figure 3A:
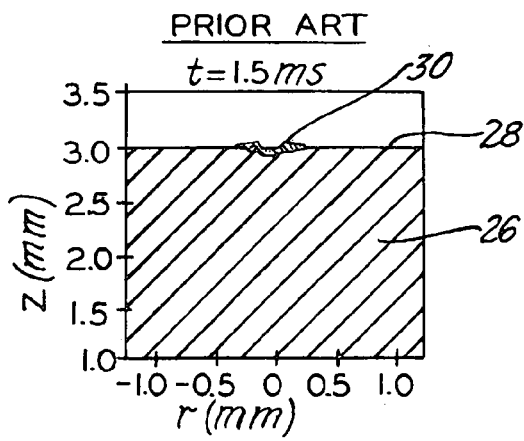
FIGS. 3A–3L illustrate graphical output from a computer model of a prior art welding process.
Figure 3B:
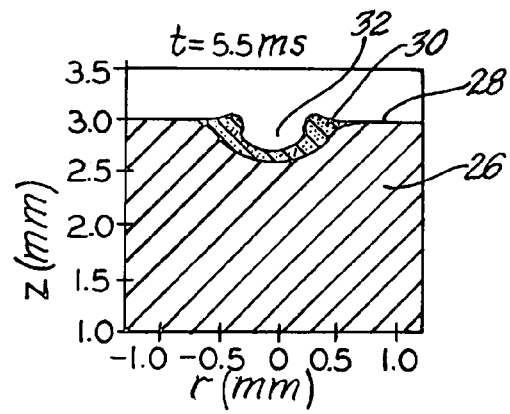
Figure 3C:
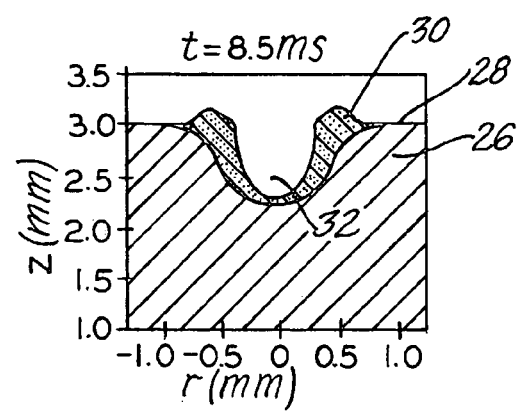
Figure 3D:
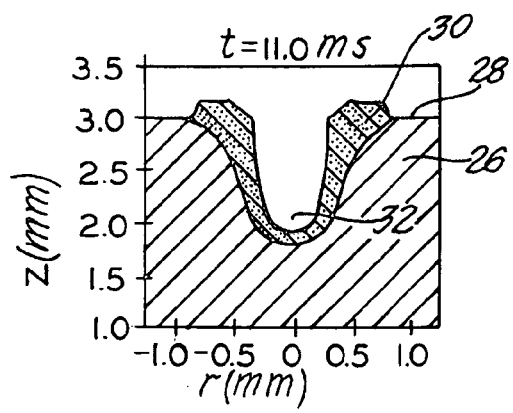
Figure 3E:
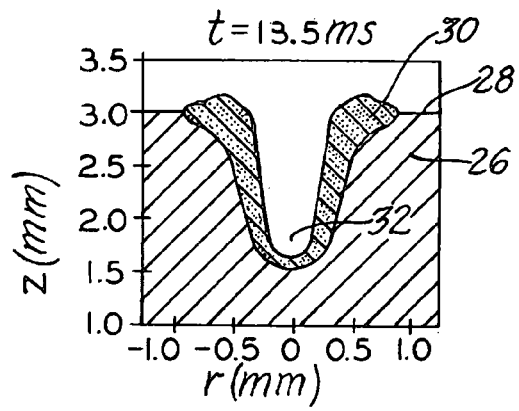
Figure 3F:
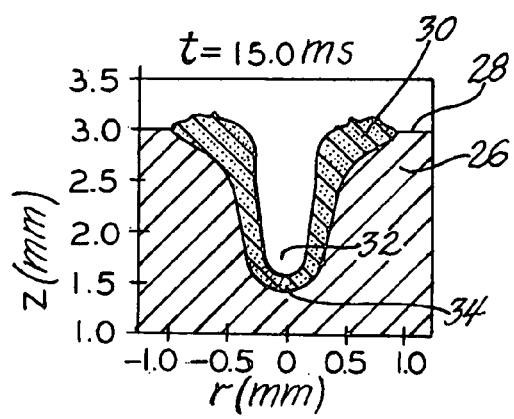
Figure 3G:
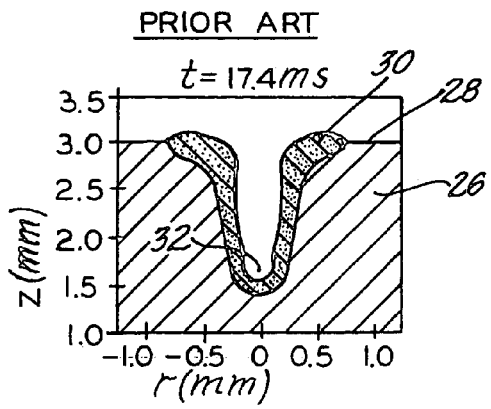

Beginning with FIG. 3A, the plot of time=1.5 ms represents the effect of a laser beam (not shown) being activated and beginning to impinge upon the top surface 28 of the aluminum sheet 26, thereby initiating a molten weld trough 30 composed of the aluminum substrate material of the aluminum sheet 26. FIG. 3B depicts the effect of progression of the laser beam deeper into the aluminum sheet 26 and the beginning of the formation of a keyhole 32 that is centrically disposed within the molten weld trough 30. The keyhole 32 is formed due to the extremely high temperature of the laser beam and the resultant vaporization of the aluminum substrate material. FIGS. 3C through 3E represent the continued formation of the keyhole 32 in the molten weld trough 30 through time=13.5 ms. Time=15.0 ms in FIG. 3F approximately represents the peak of formation of the keyhole 32, which defines a lower end 34 of the molten weld trough 30. Also, approximately at time=15.0 ms, the laser beam is deactivated. Thus, FIG. 3G represents a subsequent collapse of the molten weld trough 30, and attendant narrowing and recession of the keyhole 32, at time=17.4 ms.

Figure 3J:
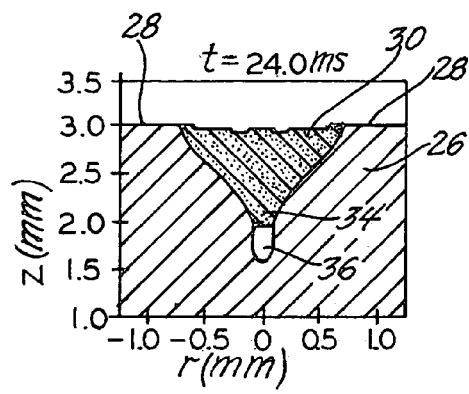
Figure 3H:
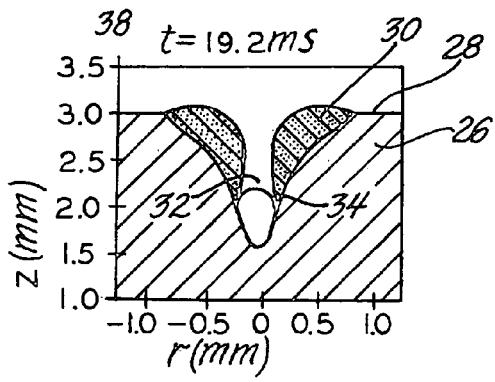

As shown in FIG. 3H, the plot of time 19.2 ms represents the continued collapse of the molten weld trough 30, wherein the lower end 34 of the molten weld trough 30 has opened up to the solidified substrate material of the aluminum sheet 26. After the laser beam has been deactivated, the molten metal within the weld trough 30 flows downwardly and starts to fill the keyhole 32. Unfortunately, however, the molten metal quickly becomes quenched by the surrounding mass of material of the aluminum sheet 26, such that it solidifies so rapidly that there is not enough time for the molten metal to completely fill the keyhole 32. Accordingly, gas becomes entrained within the re-solidified substrate material. As shown in FIG. 3I, the plot of time=22.4 ms represents the molten weld trough 30 having fused back together at the rapidly receding lower end 34 thereof, thereby leaving a gas pocket or porosity 36 entrained between the solidified aluminum sheet 26 and the still-molten weld trough 30. Also, an upper end 38 of the molten weld trough 30 shows what little is left of the quickly receding keyhole 32.

Figure 3K:
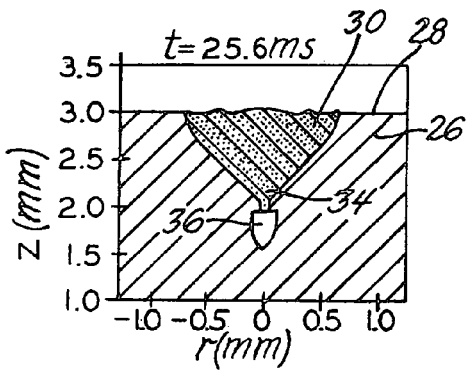
Figure 3I:
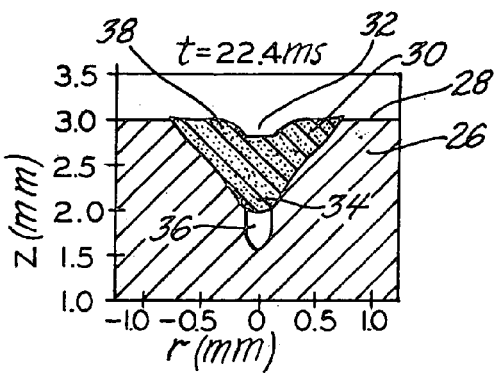
Figure 3L:
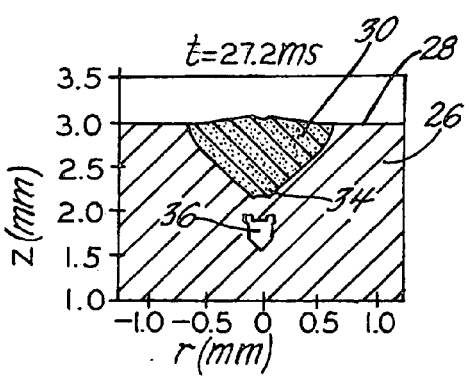

As shown in FIGS. 3J and 3K, the plots represent the complete recession of the keyhole (no longer shown) such that the molten weld trough 30 is basically flush with the solidified upper surface 28 of the aluminum sheet 26. Also, the lower end 34 of the molten weld trough 30 is shown to be rapidly receding upwardly away from the porosity 36, which is visibly entrained within the solidified aluminum sheet 26. Finally, as shown in FIG. 3L, the plot of time=27.2 ms represents the complete entrainment of the porosity 36 within the solidified aluminum sheet 26, wherein the lower end 34 of the molten weld trough 30 continues to recede upwardly. Eventually, the molten weld trough 30 solidifies, but the gas pocket 36 is essentially a void or pore in the aluminum sheet 26, which is an undesirable condition as discussed previously.

Figure 4:
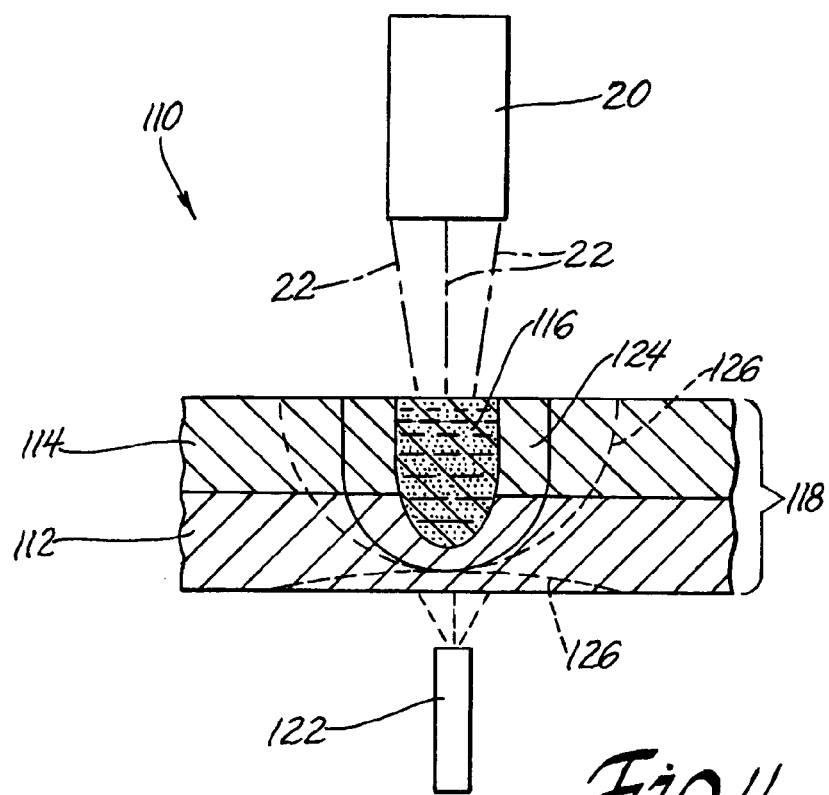
FIG. 4 illustrates a schematic representation of a laser welding setup according to one embodiment of the present invention.
Figure 5:
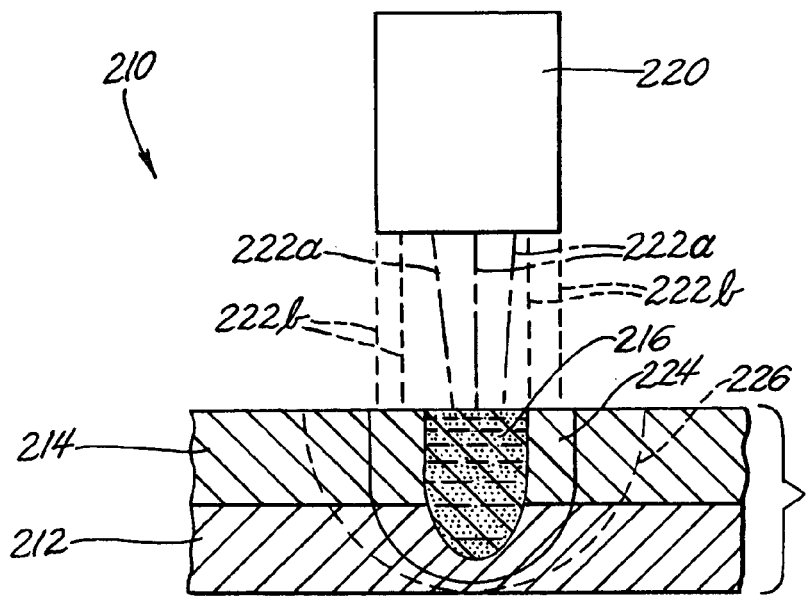
FIG. 5 illustrates a schematic representation of a laser welding setup according to another embodiment of the present invention.

Accordingly, the present invention provides a method of avoiding such porosity, as depicted in FIGS. 4 and 5. FIG. 4 illustrates a schematic representation of a laser welding setup 110 according to an embodiment of the present invention. The welding setup 110 includes a lower sheet 112 composed of aluminum, an upper sheet 114 also composed of aluminum, and a weld or molten weld trough 116 joining the upper and lower sheets 114, 112. The sheets 112, 114 may be distinct and separate components that are positioned together to form a lap joint or the like for an assembly 118. Alternatively, the sheets 112, 114 may be distinct sections of a single component that is bent or otherwise formed to bring the sections into overlapping proximity for joining, for example, in the manufacture of a tube. Moreover, the present invention encompasses welding setups wherein more than two sheets are welded together. The weld 116 is shown in cross section and may either be a cross section of a linear bead of a weld bead or may be a cross section of a discrete spot or tack weld. In any case, the weld 116 is produced by a laser beam 22 that is focused about ⅔ of the way into the thickness or depth of the assembly 118 and that emanates from the laser apparatus 20 with or without a shield gas supply (not shown).

Still referring to FIG. 4, a separate additional heating source 122 is provided on a back or underside of the lower sheet 112. The additional heating source 122 may be another laser, a flame torch, an ultrasonic device, microwave apparatus, a resistance heating element, or the like. In any case, the additional heating source 122 should follow the path that the welding laser beam takes. Thus, the additional heating source 122 could be mounted to similar traversable apparatus as that typically used for the welding laser. Also, the additional heating source 122 may be placed against the assembly 118 or spaced apart therefrom as shown, and the computer model assumed the additional heating source 122 to be an arc heating device on the order of about 5.0 mm in diameter and operating at 110 volts and 590 amps. An arc heating device may be a tungsten-inert-gas (TIG) welding device.

The additional heating source 122 is extrinsic to the welding laser beam 22 itself, in order to heat a zone 126 around the molten weld trough 116 and thereby increase the temperature thereof and a heat-affected zone 124 therearound. The heat-affected zone 124 is defined herein as that zone within a substrate metal around a molten weld trough that may or may not undergo structural changes due to heat generated by the welding process, but that does not melt during welding. Also, the zone 126 is defined to include any portion of the molten weld trough 116, the heat-affected zone 124, or wider. The additional heat generated by the additional heating source 122 acts to slow down the quenching and solidification rate of the molten weld trough 116 and tends to prevent thermal shock and thereby prevent cracking and porosity within the molten weld trough 116. In a sense, the additional heat alters the path of the solidification of the molten metal of the weld trough 116 so as to allow the molten metal to completely flow to the bottom of the molten weld trough 116 and thereby displace any trapped gas bubbles therein.

FIG. 5 illustrates a schematic representation of a laser welding setup 210 according to another embodiment of the present invention. Again, the laser welding setup 210 includes lower and upper sheets 212, 214 of aluminum, with a weld bead or molten weld trough 216 therebetween. The sheets 212, 214 may be distinct and separate components that are positioned together to form a lap joint or the like for an assembly 218. In this setup 210, however, the molten weld trough 216 is produced by a modified laser apparatus 220 that produces a primary welding laser beam 222a and a secondary heating laser beam 222b. The two laser beams 222a, 222b are produced by splitting an originating laser beam (not shown) within the laser apparatus 220. In general, it is well-known to split an originating laser beam, such as to provide two welding laser beams. What is not previously known, however, is to split an originating laser beam into a welding laser beam and into a separate heating laser beam.

For example, one or more parabolic mirrors (not shown) may be disposed within the laser apparatus 220 and may have different bends therein to fractionate the originating laser beam into the welding and heating laser beams 222a, 222b. Accordingly, the secondary heating laser beam 222b provides a heating source that has been fractionated from and that is extrinsic with respect to the welding laser beam 222a. In any case, the laser apparatus 220 produces the primary welding laser beam 222a that has a focal point within the lower and upper sheets 212, 214, which may be provided at about ⅔ of the way down into the depth or thickness of the assembly 218. And the laser apparatus 220 produces the secondary heating laser beam 222b that has a focal point somewhere on or below the assembly 218 of the lower and upper sheets 212, 214 so as to merely warm, and not melt, the lower and upper sheets 212, 214. As illustrated, the secondary heating laser beam 222b is wider than the primary welding laser beam 222a so as to widen a heat-affected zone 224 around the molten weld trough 216.

For both of the above-described embodiments of the present invention, the inventive aspect does not merely involve expanding the width of the molten weld trough 116, 216. Rather the present invention involves increasing the temperature of a zone 126, 226 encompassing the molten weld trough 116, 216 and heat-affected zone 124, 224, so as to widen the heat-affected zone 124, 224 and thereby provide a greater thermal buffer between the relatively hot molten weld trough 116, 216 and the relatively cool substrate materials. Thus, any heating source 122, 222b may be used as long as it is capable of increasing the temperature of substrate materials so as to widen a heat affected zone 124, 224. In fact, the sheets 112, 114, 212, 214 themselves could be heated, such as by connecting each sheet to a different pole of a resistance welding apparatus (not shown) so as to drive current therethrough to generate heat therein. Thus, the heating devices 122, 222 of the present invention create a heat-intensified zone of material surrounding the molten weld trough so as to slow solidification of the molten weld trough to allow porosity to vent or escape therefrom and thereby prevent entrainment of the porosity within the solidified materials.

Computer modeling of the weld joint was conducted to determine how much heat is required to avoid porosity in the weld. In modeling of the prior art aluminum laser welding without an additional heating source, a gas bubble became entrained within the molten weld trough while the width of the heat-affected zone was approximately 2.0 mm at the top surface of the aluminum sheet. In the computer model of the aluminum laser welding with the additional heating source, it was predicted that a gas bubble would become entrained within the molten weld trough while the width of the heat-affected zone was approximately 3.0 mm at the top surface of the aluminum sheet. Thus the model predicted that the present invention would effectively widen the heat-affected zone by 50%, which, according to the model, is sufficient to slow the solidification of the molten weld trough until the gas bubble dissipates.

FIGS. 6A–6L are representations of computer generated output from a computer model of laser welding of aluminum according to the present invention. The model assumed a welding beam spot size of 0.4 mm from a 2 kilowatt laser through a single 3.0 mm thick aluminum sheet. The model further assumed an arc heating device applied from the bottom of the lower sheet toward the weld in a 5 mm diameter centered about the laser beam and being 110 volts and 590 amps. Those of ordinary skill in the art will recognize that it may be possible to use less current to achieve similar heating effects.

FIGS. 6A–6L plot a sequence of keyhole formation, molten metal flow, and solidification through time 1.5 ms to 38.5 ms. The plots represent a predetermined thickness of the aluminum sheet through which a laser beam travels.

Figure 6A:
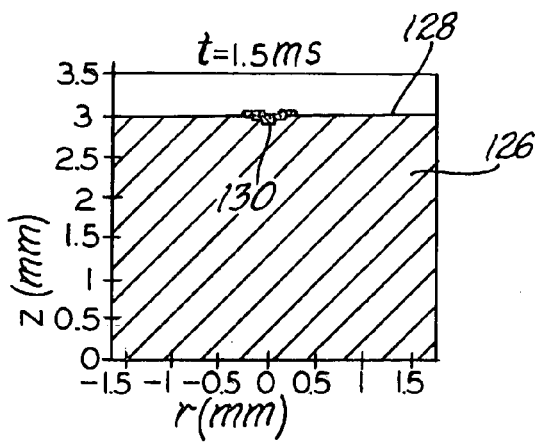
FIGS. 6A–6L illustrate graphical output from a computer model of a welding process according to the present invention.
Figure 6D:
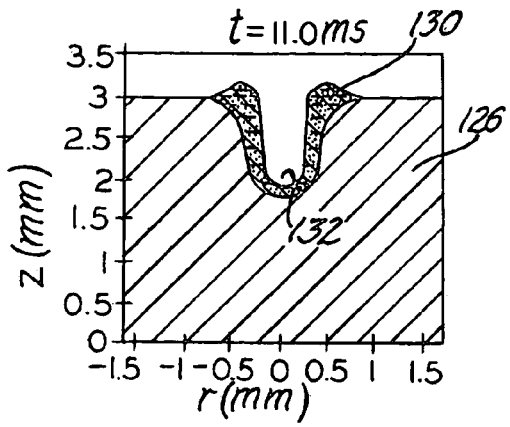
Figure 6B:
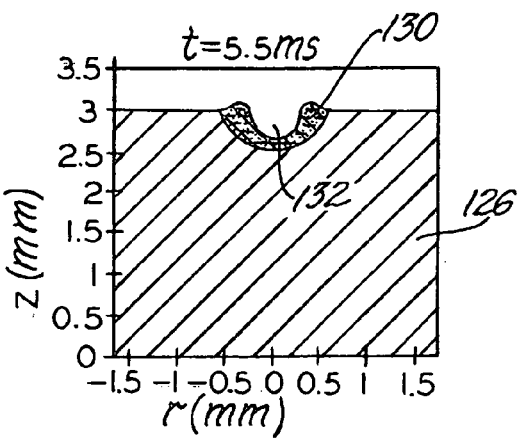
Figure 6E:
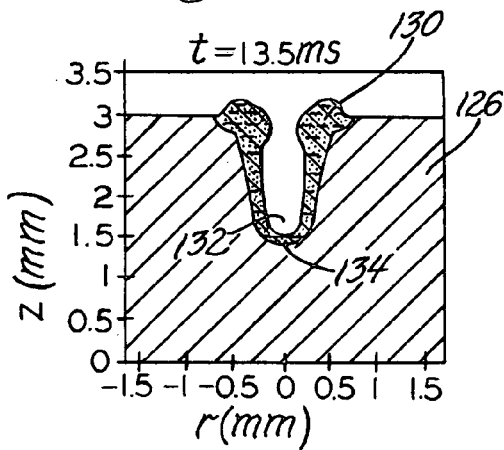
Figure 6C:
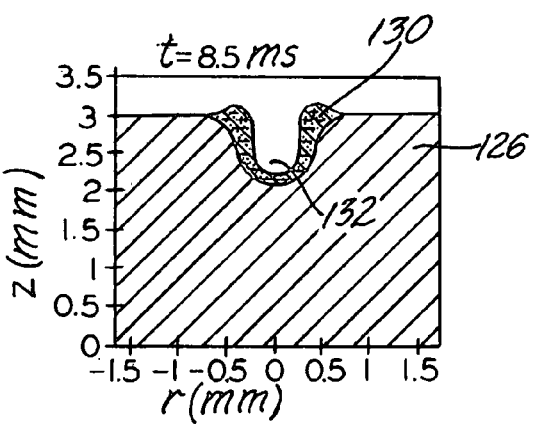

As shown in FIG. 6A, the plot of time=1.5 ms represents the effect of a laser beam (not shown) that is just beginning to impinge on a top surface 128 of an aluminum sheet 126, thereby initiating a molten weld trough 130. The plot of time=5.5 ms represents the formation of a keyhole 132 in the molten weld trough 130, as shown in FIG. 6B. FIGS. 6C and 6D represent the continued formation of the keyhole 132 in the molten weld trough 130 through time=11.0 ms. In FIG. 6E, the plot of time=13.5 ms represents the peak of the formation of the keyhole 132, wherein a lower end 134 of the molten weld trough 130 is defined. Approximately at this time, the laser beam is deactivated and the molten weld trough 130 begins to collapse.

Figure 6F:
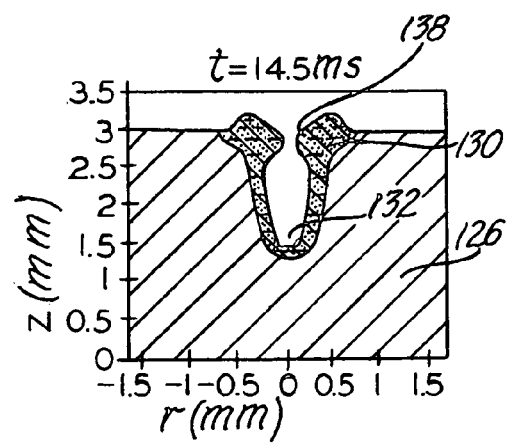
Figure 6G:
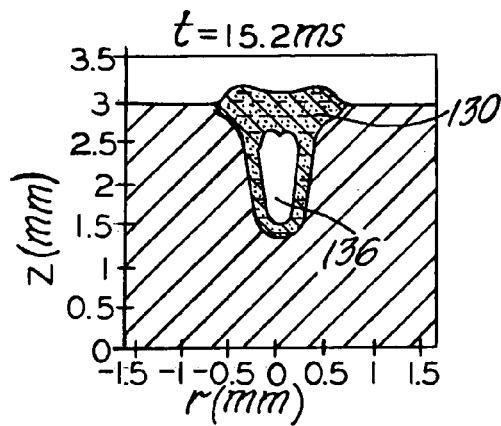
Figure 6J:
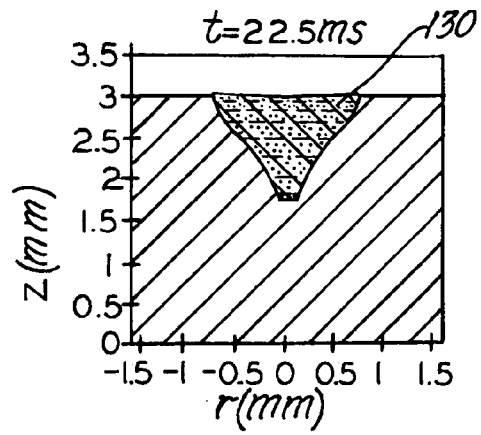

In contrast to the prior art, here the molten weld trough 130 starts to collapse earlier in the weld cycle, which is due to the additional heat input from the additional heating source and the attendant decrease in viscosity of the molten metal within the molten weld trough 130. In FIG. 6F, at time=14.5 ms, an upper portion 138 of the molten weld trough 130 is shown collapsing radially inwardly. The molten weld trough 130 collapses together at the upper portion 138 thereof, wherein a hot plasma gas bubble 136 becomes entrapped therein, as depicted in the plot of time=15.2 ms in FIG. 6G. The trapped hot plasma gas bubble 136 tends to delay the solidification of the molten metal of the weld trough 130, especially at the lower portion 134 thereof. Thus, under the increased temperatures surrounding the weld trough 130, there is sufficient time for the molten metal at the upper portion 138 of the weld trough 130 to flow downward and completely fill the keyhole 132 before solidification takes place. Hence, the porosity problem of the prior art is eliminated.

Figure 6H:
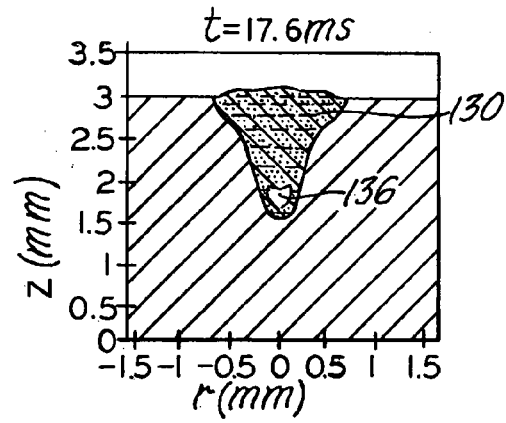
Figure 6K:
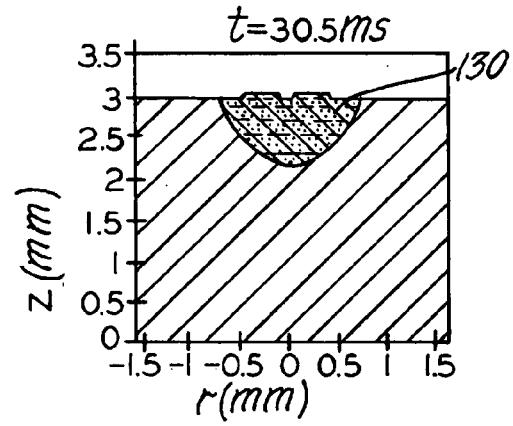
Figure 6I:
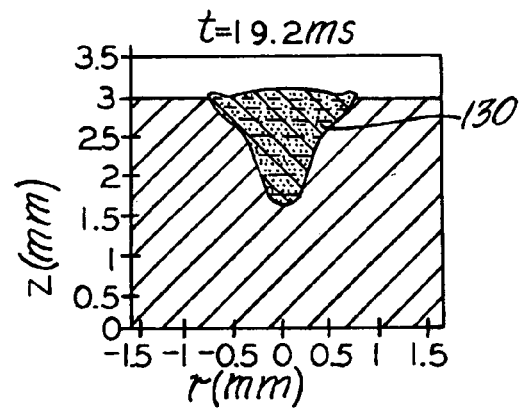
Figure 6L:
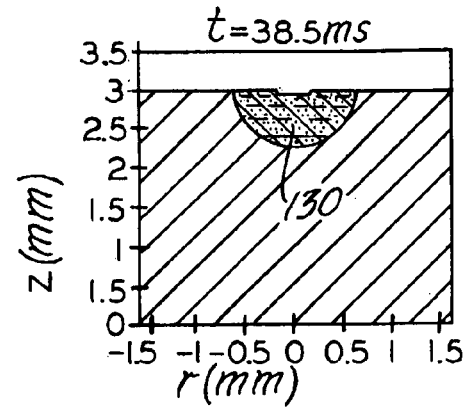

The additional heating source of the present invention tends to increase the temperature of the substrate materials being welded together, thereby effectively widening the heat-affected zone around the weld and preventing rapid solidification the weld while porosity is still entrained therein. Accordingly, the plot of time 17.6 ms illustrates the molten weld trough 130 further collapsing inwardly onto itself and the gas bubble 136 dissipating, as shown in FIG. 6H. FIGS. 6I through 6L illustrate the further narrowing and recession of the molten weld trough 130 as it solidifies.

Those of ordinary skill in the art will recognize that computer modeling does not necessarily result in an exact replication of real world conditions. Therefore, the disclosure herein relating to the computer model is set forth as a general example for better understanding of the possible effects of employing the present invention as contrasted with the prior art.

The present invention is believed to be particularly applicable to and effective in hybrid laser-arc welding, in which a laser welding apparatus and a tungsten-inert-gas (TIG) and gas metal arc welding (GMAW) apparatus in spray transfer mode is used in combination to join aluminum.

It should be understood that the invention is not limited to the embodiments that have been illustrated and described herein, but that various changes may be made without departing from the spirit and scope of the invention. The present invention has been described with reference to directional terminology such as upper and lower. Such terminology is merely intended to facilitate understanding of the present invention and those of skill in the art will recognize that the invention may be carried out in any orientation desired. Moreover, the present invention has been described in reference to aluminum and magnesium materials. But, the present invention is intended to encompass other lightweight metal materials, such as titanium and the like. Accordingly, it is intended that the invention not be limited to the disclosed embodiments, but that it have the full scope permitted by the language of the following claims.

The invention claimed is:

1. A method of laser welding aluminum or magnesium members, said method comprising:
   positioning said members together in contact between facing surfaces thereof to expose a first outer surface of at least one of said members to laser irradiation;
   directing a welding laser beam at said members so as to form a molten weld pool to fuse said members together;
   moving said welding laser beam relative to said members;
   positioning a heat source supplemental to the welding laser beam at a second outer surface of at least one of said members that is substantially opposite of said first outer surface; and
   heating a zone of said members with the heating source supplemental to the welding laser beam so as to slow the rate of solidification of said molten weld pool, thereby enabling formation of a substantially porosity-free weld bead joining said members.

2. A method as claimed in claim 1 wherein said heating step includes widening a temperature distribution in said members around said molten weld pool by at least 25%.

3. A method of forming a linear weld between upper and lower members composed of aluminum or magnesium, said method comprising:
   positioning said upper and lower members together in contact between facing surfaces thereof to expose a first outer surface of said upper member to laser irradiation;
   moving a welding laser beam in a path over said first outer surface, said welding laser beam having an energy and width to progressively melt a trough of molten metal to a depth through said upper member and into said lower member, said molten metal in said trough having a void filled with gas, and said molten metal re-solidifying into re-solidified metal after the passage of said welding laser beam;
   positioning a heat source supplemental to the welding laser beam at a second outer surface of at least one of said members that is substantially opposite of said first outer surface; and
   heating in and around said trough with the heating source supplemental to the welding laser beam to slow the rate of solidification of said molten metal into said re-solidified metal, thereby preventing entrainment of said gas within said re-solidified metal.

4. A method as claimed in claim 3, wherein said moving step includes the depth of said trough being greater than its width.

5. A method as claimed in claim 3 wherein said heating step includes widening a temperature distribution in said members around said molten weld trough by at least 25%.

6. A method of improving the quality of a laser weld joining an assembly of members, said method comprising:

moving a welding laser beam in a path over said assembly, said welding laser beam having an energy and width to progressively melt a trough of molten metal to a depth through said upper member and into said lower member, said molten metal in said trough having a void filled with gas, and said molten metal re-solidifying into re-solidified metal after the passage of said welding laser beam;

positioning a heat source supplemental to the welding laser beam on an opposite side of said assembly from said welding laser beam directing heat from the heating source supplemental to the welding laser beam toward said trough of molten metal and in accordance with said path so as to widen a heat-affected zone around said trough for slowing the rate of solidification of said molten metal into said re-solidified metal, thereby preventing entrainment of said gas within said re-solidified metal.

7. A method as claimed in claim 6, wherein the depth of said trough is greater than its width.

8. A method as claimed in claim 6 wherein said directing step includes widening a temperature distribution in said assembly around said molten weld trough by at least 25%.

* * * * *